United States Patent Office 3,519,667
Patented July 7, 1970

3,519,667
PROCESS FOR PREPARING MONO-METHYL
OR ETHYLTIN TRICHLORIDE
Kenneth R. Molt and Ingenuin Hechenbleikner, Cincinnati, Ohio, assignors to Carlisle Chemical Works, Inc., Reading, Ohio, a corporation of Ohio
No Drawing. Filed Mar. 29, 1968, Ser. No. 717,444
Int. Cl. C07f 7/22
U.S. Cl. 260—429.7
10 Claims

ABSTRACT OF THE DISCLOSURE

Monoalkyltin trichlorides are prepared by reacting $SnCl_2$ with a 1 to 2 carbon atom alkyl chloride in the presence of a phosphonium halide, preferably phosphonium chloride. In the preferred process the monoalkyltin trichloride is separated from the reaction mixture and the catalyst and other reaction products are recycled to a reaction chamber along with more alkyl chloride to form more alkyltin trichloride. Excellent yields are obtained with virtually no waste of stannous chloride by such recycling.

---

The present invention relates to the preparation of monoalkyltin trichlorides.

The preparation of monoalkyltin trichlorides is proposed in Gloskey Pat. No. 3,340,283 utilizing various amine catalysts. Gloskey employs amines which in some instances will form quaternary ammonium compounds in situ. The maximum yield disclosed by Gloskey is that it "may be" 80% in forming butyltin trichloride. In preparing ethyltin trichloride and methyltin trichloride by the Gloskey process the yields are even lower. Gloskey utilizes not over 0.02 mole of amine per mole of stannous chloride.

Hoye British Pat. No. 1,079,641 employs sulfur or selenium containing catalysts and obtained alkyltin trichlorides. The maximum yield of butyltin trichloride based on the stannous chloride consumed was 80.5%. Albright Netherlands patent application Ser. No. 6512145 discloses a process of preparing diorganotin dihalides together with a minor amount of monoalkyltin trihalides.

It is an object of the present invention to develop an improved procedure for preparing monoalkyltin trihalides wherein the alkyl group has 1 to 2 carbon atoms.

Another object is to devise such a procedure which does not involve loss of expensive catalyst.

A further object is to prepare monomethyltin trichloride in improved yields.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting stannous chloride ($SnCl_2$) with methyl or ethyl chloride in the presence of a phosphonium halide catalyst, preferably a phosphonium chloride to form methyltin trichloride or ethyltin trichloride. Preferably the monoalkyltin trichloride formed is separated from the other reaction products and catalyst and said other reaction products and catalyst are recycled to a reaction zone, further amounts of alkyl chloride and $SnCl_2$ added to recover further amounts of the $R_1SnCl_3$ where $R_1$ is methyl or ethyl.

The preferred catalysts are phosphonium chlorides since otherwise there is anion exchange of the product. The preferred alkyl chloride is methyl chloride since the yields and reaction rates are reduced when using ethyl chloride. The yields and rates go down even further when employing higher alkyl chlorides, e.g. butyl chloride and octyl chloride. In fact with such higher alkyl chlorides the reaction rates are extremely poor and the yields are also very poor except when using the phosphonium iodides.

By this process yields of methyltin trichloride on the first and subsequent recycling are substantially quantitative based on the amount of $SnCl_2$ consumed. There is no need to add further catalyst in the recycled runs.

As the catalyst there can be used phosphonium salts of the formula

where X is a halogen, e.g. fluorine, chloride, bromine, or iodine or a pseudohalogen, e.g. —SCN. Preferably as stated X is Cl, $R_1$, $R_2$, $R_3$ and $R_4$ are alkyl, aryl, aralkyl, alkenyl.

Examples of suitable phosphonium compounds are tetramethyl phosphonium chloride, tetraethyl phosphonium chloride, tetrapropyl phosphonium chloride, tetrabutyl phosphonium chloride, tetraisopropyl phosphonium chloride, tetraoctyl phosphonium chloride, tetradodecyl phosphonium chloride, tetraoctadecyl phosphonium chloride, tetraphenyl phosphonium chloride, octyl triphenyl phosphonium chloride, methyl triphenyl phosphonium chloride, dodecyl triphenyl phosphonium chloride, tetra p-tolyl phosphonium chloride, tetrabenzyl phosphonium chloride, allyl triphenyl phosphonium chloride, methyl tributyl phosphenium chloride, trioctyl benzyl phosphonium chloride, trimethyl butyl phosphonium chloride, tetracyclohexyl phosphonium chloride, tetrabutyl phosphonium bromide, tetrabutyl phosphonium iodide, tetrabutyl phosphonium fluoride, tetrabutyl phosphonium thiocyanate, methyl triphenyl phosphonium bromide, ethyl trioctyl phosphonium iodide.

The phosphonium chloride can be preformed or it can be formed in situ by adding the appropriate reagents. Thus the phosphonium chloride can be formed in situ for example by adding an alkyl chloride to a secondary or tertiary phosphine. Thus if tributyl phosphine and methyl chloride are added to the reaction mixture there is formed methyl tributyl phosphonium chloride.

The reaction of the present invention is carried out by heating, e.g. at 50 to 250° C., preferably 100 to 200° C. although the exact temperature is not critical.

The desired methyltin trichloride or ethyltin trichloride formed is separated from the reaction mixture in any convenient manner, e.g. by distillation. The residue which includes the catalyst is recycled for subsequent runs. No loss in yields has been observed in the recycling and the recycling can be continued indefinitely, e.g. 4, 20, 100 or 1000 times.

Also no catalyst is lost in the recycling and the same catalyst can be used virtually forever.

While no solvent is required the reaction can be carried out in the presence of any inert organic solvent, i.e. one which does not undergo the Friedel-Crafts reaction. Typical solvents include ethers such as diethylene glycol methyl ether, dibutyl, ether, diethyl, ether, diethylene glycol dimethyl ether, tetrahydrofurane, aliphatic hydrocarbons, e.g. hexane, heptane, octane, gasoline, petroleum ether, cyclohexane and cycloheptane.

It has been found that the amount of stannous chloride converted to the alkyltin trichloride is never greater than the amount of catalyst on a molar basis. The best ratio is about 2 moles of stannous chloride to 1 mole of catalyst. If the ratio of $SnCl_2$ to catalyst is much larger than 2:1, e.g. 2.5:1 the reaction mixture tends to become less liquid at the temperatures employed with atmospheric pressure. If the ratio of $SnCl_2$ to catalyst is less than 2:1, e.g. 1.5:1 the reaction rate decreases at atmospheric pressure.

The reaction can be carried out under pressure conditions which can be atmospheric pressure or super atmospheric pressure or sub atmospheric pressure. Super atmospheric pressure permits the use of higher concentrations of methyl chloride and the use of less catalyst, i.e. there is a higher conversion of $SnCl_2$ to methyltin trichloride per pound of catalyst.

The alkyl chloride is conveniently employed in an amount of 2 moles per mole of $SnCl_2$. An excess of alkyl chloride can be used, e.g. there can be as much as 8 moles or more of alkyl chloride per mole of $SnCl_2$ although usually only a slight excess of alkyl chloride is employed.

Unless otherwise indicated all parts and percentages are by weight.

It has been observed that the reaction rate decreases with time independent of the concentration of $SnCl_2$. Consequently is appears that the catalyst is complexed by the product $R_1SnCl_3$. The product formed therefore should be removed from the mixture either continuously as fast as it is formed or intermittently at frequent intervals to obtain maximum yields in any given time perod.

EXAMPLE 1

Anhydrous stannous chloride (2.0 moles) was mixed with 1.0 mole of tetrabutyl phosphonium chloride and the mixture was freed of traces of moisture by heating to 170° C. at 10 mm. Hg. The vacuum was relieved with dry nitrogen and the stirred mixture was then gassed with methyl chloride at 160–170° C. The methyl chloride was added at a rate equal to its reaction rate. After 18 hours the reaction rate was about one-tenth the initial rate. Vacuum was slowly applied and methyltin trichloride was distilled from the reaction mixture by heating to 170° C. at 2.0 mm. Hg. The distillate contained 212 grams (0.883 mole) of methyltin trichloride, M.P. 50–53° C., Cl 43.7% (Theory 44.3%).

EXAMPLE 2

To the residue from the distillation in Example 1 there was added 0.883 mole of $SnCl_2$ (equal to the amount of $SnCl_2$ consumed in Example 1) and the mixture was dried and again gassed with methyl chloride in the manner described in Example 1. After 18 hours vacuum distillation was then employed to obtain 202 grams (0.842 mole) of methyltin trichloride, M.P. 48–51° C., Cl 44%.

EXAMPLE 3

To the residue from the distillation in Example 2 there was added 0.842 moles of $SnCl_2$ and the process of Example 1 was repeated. After 18 hours of reaction the vaccum distillation yielded 203 grams (0.846 mole) of methyltin trichloride, M.P. 48–51° C.

EXAMPLE 4

To the residue of Example 3 there was added 0.846 mole of $SnCl_2$ and the process of Example 1 was repeated. After 18 hours of reaction the vacuum distillation gave 204 grams (0.850 mole) of methyltin trichloride, M.P. 48–51° C.

The final residue from Example 4 weighed 520 grams and consisted of tetrabutyl phosphonium chloride catalyst, unreacted $SnCl_2$ and a small amount of methyltin trichloride.

As a result of Examples 1–4 the following observations can be made.

(1) No significant reduction in reaction rate occurs after multiple reuse of the catalyst system.

(2) A highly specific reaction for methyltin trichloride is shown by the fact that the amount of methyltin trichloride produced corresponds closely to the amount of $SnCl_2$ added in each recycle step.

The results without a catalyst are shown in the following example.

Two moles of anhydrous $SnCl_2$ was freed of traces of moisture by heating to 170° C. at 10 mm. Hg. The vacuum was relieved with dry nitrogen and the $SnCl_2$ was stirred and gassed with methyl chloride for two hours at 170° C. There was no evidence of methyl chloride absorption or reaction. Vacuum distillation yielded no methyltin trichloride.

When the tetrabutyl phosphonium chloride of Example 1 was replaced by 1.0 mole of methyltributylammonium chloride after 20 hours the reaction rate was about one-tenth the initial rate. The distillate contained only 0.645 mole of methyltin trichloride.

Upon addition of 0.645 mole of $SnCl_2$ to the residue and gasing with methyl chloride there was obtained 0.628 mole of methyltin trichloride after 20 hours. This recycling was repeated two more times to obtain 0.625 mole of methyltin trichloride in 20 hours and 0.628 moles of methyltin trichloride.

Thus the yield of methyltin trichloride with the quaternary ammonium chloride catalyst both in the initial reaction and in the recycling was slightly less than 75% of that with the quaternary phosphonium chloride even though the time of reaction with the quaternary ammonium chloride was 10% longer.

What is claimed is:

1. In a process of preparing a compound having the formula $RSnCl_3$ where R is an alkyl group of 1 to 2 carbon atoms by reacting $SnCl_2$ with an alkyl chloride of the formula RCl the improvement comprising carrying out the reaction in the presence of a phosphonium halide or thiocyanate, there being employed 1.5 to 2.5 moles of $SnCl_2$ per mole of phosphonium halide or thiocyanate.

2. A process according to claim 1 wherein the phosphonium compound has the formula

where $R_5$, $R_2$, $R_3$ and $R_4$ are selected from the group consisting of alkyl, carbocyclic aryl, aralkyl and alkenyl.

3. A process according to claim 2 wherein 2 moles of $SnCl_2$ are employed per mole of phosphonium chloride.

4. A process according to claim 3 including the step of separating the $R_1SnCl_3$ from the initial reaction mixture, adding further amounts of $SnCl_2$ and forming new $R_1SnCl_3$ by reacting $R_1Cl$ and $SnCl_2$ in the presence of the reaction residue remaining after the separation of the $R_1SnCl_3$ from the initial reaction mixture.

5. A process according to claim 4 wherein the recycling is repeated at least three times and $R_1Cl$ is methyl chloride.

6. A process according to claim 2 including the step of the $R_1SnCl_3$ from the initial reaction mixtures, adding further amounts of $SnCl_2$ and forming new $R_1SnCl_3$ by reacting $R_1Cl$ and $SnCl_2$ in the presence of the reaction residue remaining after the separation of $R_1 SnCl_3$ from the initial reaction mixture and wherein $R_1Cl$ is methyl chloride.

7. A process according to claim 1 including the step of separating the $R_1SnCl_3$ from the initial reaction mixture, adding further amounts of $SnCl_2$ and forming new $R_1SnCl_3$ by reacting $R_1Cl$ and $SnCl_2$ in the presence of the reaction residue remaining after the separation of $R_1SnCl_3$ from the initial reaction mixture.

8. A process according to claim 7 wherein the phosphoniu mcompound is a tetraalkyl phosphonium chloride.

9. A process according to claim 8 wherein 2 moles of $SnCl_2$ are employed per mole of phosphonium chloride.

10. A process according to claim 9 wherein the tetraalkyl phosphonium chloride is tetrabutyl phosphonium chloride.

References Cited

UNITED STATES PATENTS 3,340,283  9/1967  Gloskey _____ 260—429.7
3,415,857  12/1968  Hoye _____ 260—429.7

TOBIAS E. LEVOW, Primary Examiner

W. F. W. BELLAMY, Assistant Examiner